US008425850B1

(12) United States Patent
Lin et al.

(10) Patent No.: US 8,425,850 B1
(45) Date of Patent: Apr. 23, 2013

(54) LARGE PARTICLE ASH MITIGATION SYSTEM

(75) Inventors: Chao P. Lin, Columbus, OH (US); Darren C. Hanby, Frazeysburg, OH (US); Jeffery L. Hofacre, Columbus, OH (US); Thomas E. McCartney, Westerville, OH (US); James Silk, Chillicothe, OH (US)

(73) Assignee: American Electric Power Company, Inc., Columbus, OH (US)

( * ) Notice: Subject to any disclaimer, the term of this patent is extended or adjusted under 35 U.S.C. 154(b) by 101 days.

(21) Appl. No.: 12/962,978

(22) Filed: Dec. 8, 2010

(51) Int. Cl.
*B01D 46/00* (2006.01)
*B01J 19/00* (2006.01)

(52) U.S. Cl.
USPC .............. 422/176; 55/300; 55/307; 55/385.1; 422/616

(58) Field of Classification Search .................... 55/300, 55/447; 95/268, 270; 110/216, 217, 322, 110/342, 345
See application file for complete search history.

(56) References Cited

U.S. PATENT DOCUMENTS

| | | | |
|---|---|---|---|
| 6,994,036 B2 | 2/2006 | Grommes et al. | |
| 7,100,521 B2* | 9/2006 | Ryan | 110/216 |
| 7,531,143 B2 | 5/2009 | Brüggendick et al. | |
| 7,556,674 B2 | 7/2009 | Andersson | |
| 2005/0150439 A1* | 7/2005 | Ryan | 110/216 |
| 2006/0210721 A1* | 9/2006 | Hall | 427/446 |
| 2008/0041417 A1* | 2/2008 | Varner et al. | 134/6 |
| 2009/0202401 A1 | 8/2009 | Brüggendick et al. | |
| 2011/0048234 A1* | 3/2011 | Iannacchione | 95/270 |
| 2011/0207597 A1* | 8/2011 | Tembaak et al. | 502/22 |

OTHER PUBLICATIONS

Control of Nitrogen Oxide Emissions: Selective Catalytic Reduction (SCR), Clean Coal Technology, U.S. Department of Energy and Southern Company Services, Inc., Topical Report No. 9, Jul. 1997, pp. 1-14.
Sobolewski, Hans; Hartenstein, Hans; Martin, Marilynn; Jancauskas, Joseph; and Harrell Michael, Emissions Control: User-Designated Large-Particle Ash Screens Minimize Scr Fouling, http://www.coalpowermag.com/print/plant_designs/Emissions-Control-User-Designed-Large-Particle-Ash, Oct. 6, 2009.
Van Ormelingen, Jean-Jacques; Jensen-Holm, Hans; and Hvid, Søren Lovmand, Experience from Erection and Operation of Two SCR Dentitrification Units at Electrabel's Langerlo Power Station, Genk Belgium, pp. 1-27, Paper #101.

(Continued)

*Primary Examiner* — Duane Smith
*Assistant Examiner* — Minh-Chau Pham
(74) *Attorney, Agent, or Firm* — Standley Law Group LLP

(57) ABSTRACT

Embodiments describe an arrangement for reducing the amount of LPA that reaches a NOx reducing apparatus such as a SCR system. The arrangement includes deflection elements, screens, means for dislodging any LPA that might become lodged in the screens, an aperture for removing the ash through, hoppers or collection means and an ash conveyance system. The arrangement is positioned in a region of ductwork with a reduced gas flow such as the SCR reactor. The screens are positioned relative to one another to direct the LPA downward toward an aperture for removal. In one embodiment the positioning of the screens creates a half-trough or inverted pyramid appearance when placed next to a vertical wall in the flue gas ductwork or the SCR reactor. The low point of the trough is in communication with the aperture allowing the LPA to exit the flue ductwork.

20 Claims, 4 Drawing Sheets

OTHER PUBLICATIONS

Craig, Marie; Bohannan, Larry C.; Weigel, K.; and Ayers, C., Popcorn Ash at Georgia Power Company's Plant Bowen; Expereinces and Removal Strategies.

Ryan, Anthony and St. John, Bryce, SCR System Design Considerations for "Popcorn" Ash, EPRI-DOE-EPA-AWMA Combined Power Plant Air Pollutant Control Mega Symposium, May 19-22, 2003, Washington, D.C, pp. 1-8, The Babcock & Wilcox Company, Barberton, Ohio.

Gretta, William J.; Copolo, Thomas K.; and Yurkanin, Thomas, A Proven Successful Approach to the Design of SCR Large Particle "Popcorn" Ash Screens, pp. 1-16.

Lonnberg, William C.; Biggs, J. Corie; Cosorski, Stephen J.; and Sprangler, Ryan C., On the SCR Learning Curve, Power Engineering, Oct. 2004, pp. 46-54, www.power-eng.com.

* cited by examiner

US 8,425,850 B1

LARGE PARTICLE ASH MITIGATION SYSTEM

CROSS-REFERENCE TO RELATED APPLICATIONS

This non-provisional patent application makes no claim of priority to any earlier filings.

TECHNICAL FIELD

The disclosed embodiments are in the field of emission control, and more particularly directed toward large particle ash removal in conjunction with coal-fired boiler emission control.

BACKGROUND OF THE ART

Varieties of gases are produced and released during the combustion of coal in the production of electricity. Domestic power plants that release $NO_x$ gases are required by Federal and state laws to control the amount of $NO_x$ gaseous emissions from their stacks. In order to comply with these laws many plants employ Selective Catalytic Reduction (SCR) systems. SCR systems employ catalysts to enhance the removal of $NO_x$ gases from the flue gas as the flue gas passes over the catalyst and reacts with ammonia injected upstream of a SCR reactor to form nitrogen and water vapor. In order for SCR systems to operate effectively the flow of gas over the catalyst should ideally be even and unimpeded.

Large Particle Ash (LPA) or so-called popcorn ash has become a significant issue in the operation and performance of SCR systems on, for example, pulverized coal boilers. Many SCR systems employ catalyst with plate, honeycomb, or corrugated arrangements to maximize catalyst surface area. However, these arrangements often leave the SCR catalysts susceptible to pluggage from LPA generated in some coal fired boilers during plant operation.

It is generally understood that LPA is the result of molten ash (slag) formed in upper furnace and super heater areas and the break-up of ash deposits on tube surfaces of boiler convection passes by soot blowing operation. LPA, if not removed from the flue gas stream, can become lodged within SCR catalyst openings resulting in significant pluggage, erosion and accelerated catalyst deactivation. When LPA blocks the catalyst openings, finer ash particles are prevented from passing through the catalyst and will build up, sometimes in very large amounts, on top of the catalyst. It is not uncommon for piles of ash to reach several feet in height on the top layer of catalyst. With significant amounts of ash buildup, the free flow area of the SCR reactor can be greatly reduced. The flue gas flow is then forced through the remaining open areas of catalyst layer creating higher gas velocities and higher catalyst erosion rates as well as higher pressure drop across catalyst layers. The catalyst underneath the ash piles or the catalyst of which the openings are plugged by LPA is not available for NOx reduction reaction resulting in NOx reduction impairment and higher NOx emission. Excessive ash buildup can also create structural loading concerns as SCR reactors are typically not designed for such large accumulations of ash. All of these issues can ultimately result in forced unit outages for cleaning the ash buildups and the ash pluggage within catalyst openings. Damage to the catalyst from the LPA, however, will require catalyst cleaning, regeneration or replacement. Overall, allowing LPA to reach the SCR reactor can create significant operation and maintenance issues, costly repairs or premature catalyst replacement.

Conventional LPA mitigation systems generally rely on gravity in so-called dropout hoppers often positioned in a horizontal section of ductwork, or in the flue gas stream under an area where ash drop-out normally occurs. These occasionally include baffles in order to deflect the LPA further into the hoppers. The effectiveness of dropout hoppers on LPA capture usually is not completely assured and depends on hopper and adjacent ductwork geometries as well as particle density, particle shape and size distribution of LPA. One drawback to this arrangement is the combination of the low density of LPA and the high gas velocities in the flue gas stream. This combination can lead to LPA that partially dropped out being re-entrained into the stream and continuing onto the SCR reactor.

The second common type of technique is full cross-section screens positioned upstream of a SCR reactor. Often these include flat, pleated or oscillating screens. But whatever the choice of screen, all are affected by high gas velocities in the flue gas stream. The high velocities cause high pressure drop and erosion of the screens. If the screens are plugged by LPA this will increase pressure drop and erosion of unplugged screen areas and result in detrimental effects. If the screen erodes prematurely it will necessitate maintenance and replacement resulting in costly downtime for the boiler.

SUMMARY OF THE INVENTION

This and other unmet needs of the prior art are met by a device as described in more detail below.

An arrangement for reducing the amount of LPA that reaches a NOx reducing apparatus such as a SCR system. The arrangement includes deflection elements, screens, means for dislodging any LPA that might become lodged in the screens, an aperture for removing the ash through, hoppers or collection means and an ash conveyance system. The arrangement is positioned in a region of ductwork with a reduced gas flow velocity. The screens are positioned relative to one another to direct the LPA toward the aperture for removal. The screens are positioned across a portion of the cross-section of ductwork. An exemplary positioning of the screens creates a half-trough or inverted pyramid appearance when placed next to a vertical wall in the flue gas ductwork or the SCR reactor. The low point of the trough is in communication with the aperture allowing the LPA to exit the flue ductwork. Moreover, pursuant to an exemplary embodiment, the screens may consist of metal sheets perforated to facilitate gas flow.

BRIEF DESCRIPTION OF THE DRAWINGS

A better understanding of the exemplary embodiments of the invention will be had when reference is made to the accompanying drawings, wherein identical parts are identified with identical reference numerals, and wherein.

DETAILED DESCRIPTION

Figure 1:
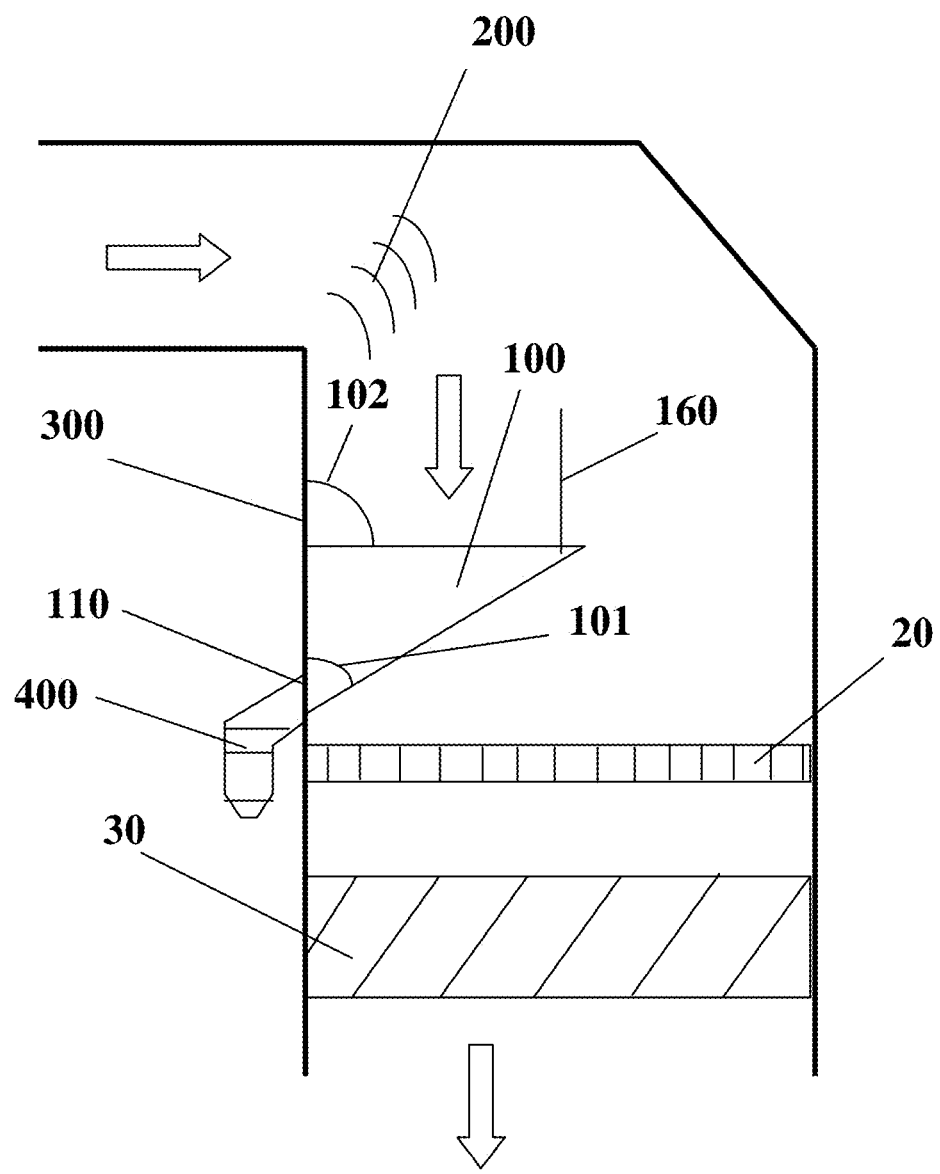
FIG. 1 is an elevation view of an embodiment of the horizontal section of an inlet duct to an SCR reactor and upper part of SCR reactor

As used herein, the term flue gas stream refers to the flow of gas that leaves the boiler and travels through the flue gas ductwork. The flue gas ductwork provides means to contain flue gas as it moves through emission control equipment and exhausts to the stack. The term SCR reactor refers to a section of enlarged ductwork which contains several layers of SCR catalyst and where the NOx reduction reaction occurs. The term rectifier section refers to a section of the SCR reactor, upstream of the catalyst, having a grating or other means to straighten the flue gas flow before it reaches the SCR catalyst.

Many flue gas streams that include SCR reactors position the reactor so that the flow of the flue gas is in a vertical direction (often generally downwards). As such, for the sake of simplicity, the following discussion will often use the terms above the SCR reactor and will proceed with a general arrangement of LPA mitigation screens positioned near the top of a SCR reactor, above an optional rectifier which is in turn positioned above the SCR top catalyst layer.

Flue gas velocities in a SCR reactor are generally lower than in flue gas ductwork. In many parts of a flue gas pathway in ductwork, flue gas velocities are in the range of 40-60+ ft/sec. However, due to the larger cross sectional area of the SCR reactor relative to the ductwork, typical velocities in a SCR reactor are anywhere from one-third to one-quarter of those elsewhere. Placing LPA mitigation screens in the rectifier section of the SCR reactor allows for less pressure drop and longer life because of lower erosion and pluggage of screens due to lower gas velocities than if placed in the flue gas ductwork.

In order to effectively prevent pluggage of SCR catalyst, a large majority of the LPA must be captured upstream of the SCR catalyst. Thus, LPA mitigation screens may span an entire cross-section of flue gas ductwork or the SCR reactor. However, the flue gas stream makes a 90 degree turn entering into the SCR reactor, and due to the weight and size of LPA, the majority of LPA is in the flue gas adjacent to SCR reactor inlet sidewall. Alternatively, LPA mitigation screens may cover only the inlet-side portion of the cross section of the SCR reactor. The screen is oriented at an angle relative to the vertical inlet-side wall of an SCR reactor, in order to more effectively use gravity and the forces present in a flue gas stream. In an embodiment, a trough arrangement of screens allows for efficient sequestration and transport of LPA from a flue gas stream. A trough arrangement includes several triangular or rhomboid shaped sections of screen material. Sieve sections may be arranged in essentially an inverted pyramid shape, such that the sieve portions form a funnel-shape, ending in communication with one LPA discharge opening on the inlet sidewall of the SCR reactor. The peak (the lowest point) of the inverted pyramid shape spills into a LPA discharge opening. The opening is in communication with ductwork leading to, for example, hoppers for disposal of LPA.

A trough, or inverted pyramid arrangement provides a downhill path for sequestered LPA allowing the force of gravity to act in concert with the force of the flue gas stream on the LPA driving it toward a LPA discharge opening on the inlet sidewall of the SCR reactor. Thus, in an embodiment, a LPA screen trough includes at least two screens arranged at an angle relative to the inlet sidewall of a SCR reactor, forming a downhill trough-pathway toward an LPA discharge opening positioned on the inlet sidewall of the SCR reactor.

In an embodiment, a LPA mitigation system also includes rappers, ash hoppers, and ash conveying system. Rappers are mechanical devices for shaking screens or sieves in order to dislodge particulate matter that has become lodged in the screen.

In an embodiment, LPA screens are positioned near the top of SCR reactor that has a reduced gas velocity. The reduced gas stream velocity is due to an increase in the cross sectional area of the SCR reactor is greater than the other ductwork that the flue gas stream is passing through.

Turning to the drawings for a better understanding, FIG. 1 shows a schematic of an embodiment of flue gas flow (denoted by arrows) in a typical set-up, through the flue gas duct (horizontal portion) and SCR reactor (vertical portion). Within the SCR reactor there are; a LPA mitigation trough 100, optional vertical screen 160, a flow rectifier 20, top SCR catalyst layer 30, turning vanes 200, and an inlet sidewall 300. The LPA mitigation arrangement includes at least one screen trough 100, at least one LPA discharge opening 110, often on the inlet sidewall, and at least one LPA discharge apparatus 400. Because of the size and weight of LPA, a majority of the LPA remains nearer to the inlet sidewall 300 of the SCR reactor as the flue gas stream turns from horizontal to vertical. The screen trough(s) are positioned in the upper part of the SCR reactor, downstream from the turning vanes, and upstream of the top SCR catalyst layer.

The term screens should be interpreted to include perforated plates, wire mesh screens, wedge wire screens or the like. The term is intended to convey an apparatus with a plurality of openings sized to allow the flue gas and fine ash to pass with minimal resistance, yet small enough that LPA with circumference large enough to plug the SCR catalyst is prevented from passing.

The lower edge of the LPA trough 100 has a lower profile angle 101 relative to the SCR reactor inlet sidewall 300. The angle of inclination is such that the LPA particles, that are sequestered, move or are shaken off toward the inlet side of the SCR reactor and a discharge opening, under the force of gravity and flue gas flow. The angle may be anywhere between 10 and 70 degrees from the inlet sidewall. The trough also has a top profile angle 102. This angle is such that the top of the profile of the trough is near the turning vanes at the top of the reactor and may be substantially parallel to the lower edges of the turning vanes.

As noted above, the LPA mitigation system includes a LPA discharge opening 110 along the inlet sidewall 300 of the SCR reactor. Because of the weight and size of LPA, after the 90 degree turn at the top of the SCR reactor, most LPA in the flue gas stream flowing downward is on the reactor inlet side. Due to this, LPA mitigation screens may not need to cover the entire cross sectional area of the SCR reactor. The trough may only cover a portion of the cross-section of the SCR reactor. If the remaining LPA which is not captured by LPA mitigation screens 100 causes catalyst pluggage, an optional vertical screen 160 can be installed to enhance the collection of LPA. The need for optional vertical screen is determined on an application specific basis.

Figure 2:
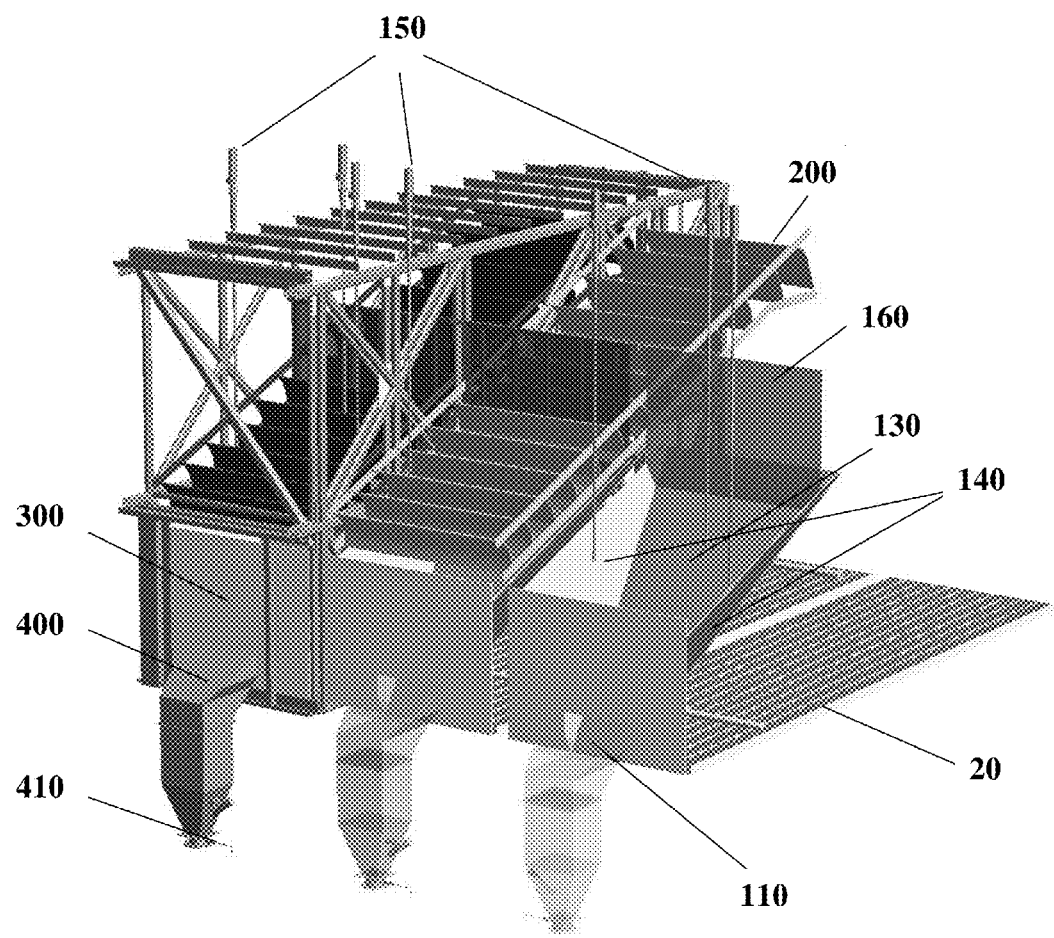
FIG. 2 is a perspective view of an arrangement for mitigation of LPA.

FIG. 2 illustrates an embodiment wherein one screen trough comprises 3 screens, and the LPA mitigation system includes more than one screen trough. It is apparent from the drawing that in this alternative embodiment, each screen trough is comprised of a central screen 130, in this case a rhomboid, and two substantially identical triangular screens 140 arranged on either side of the central screen. Each screen trough feeds the collected LPA into a LPA discharge opening 110 in the inlet sidewall 300.

As is clear from the drawings, the general shape of the screen troughs is that of an inverted pyramid situated below the turning vanes 200 and above the flow rectifier 20. The inverted pyramid may come substantially to a point at the LPA discharge opening 110, as would be the case if the central screen was a triangle. In the trough represented in FIG. 2, the central screen is of a rhomboid shape in which case, the narrower of the two parallel sides would correspond with the respective LPA discharge opening creating a funnel shape. As is clear from the drawings, each of the screens is arranged at an angle to facilitate LPA travel toward the center of the trough and the LPA discharge opening 110. For additional LPA capture, an optional vertical screen 160 can be installed on the top side of central screen.

In an alternative embodiment, the LPA mitigation system includes a means 150 for applying force to the screens in order to unseat LPA that may have been lodged in the screen openings. In an embodiment, each trough includes a means for applying force to the screens for each screen included in the system. The means 150 may be, for example rappers, which physically move the screens by impacting them with a vertical force and thus dislodge LPA. Means for applying force may include those known and in use on electrostatic precipitators.

FIG. 2 also provides additional illustration for the rectifier 20, and shows an embodiment of the LPA mitigation system where the LPA discharge openings lead to a LPA discharge apparatus 400. In the embodiment illustrated in FIG. 2 the discharge apparatus includes ductwork at the LPA discharge opening, the ductwork directs the collected LPA to a collecting means 410 for collection of the LPA and subsequent removal, and may lead to a conveyor system for transport of the LPA.

Figure 3:
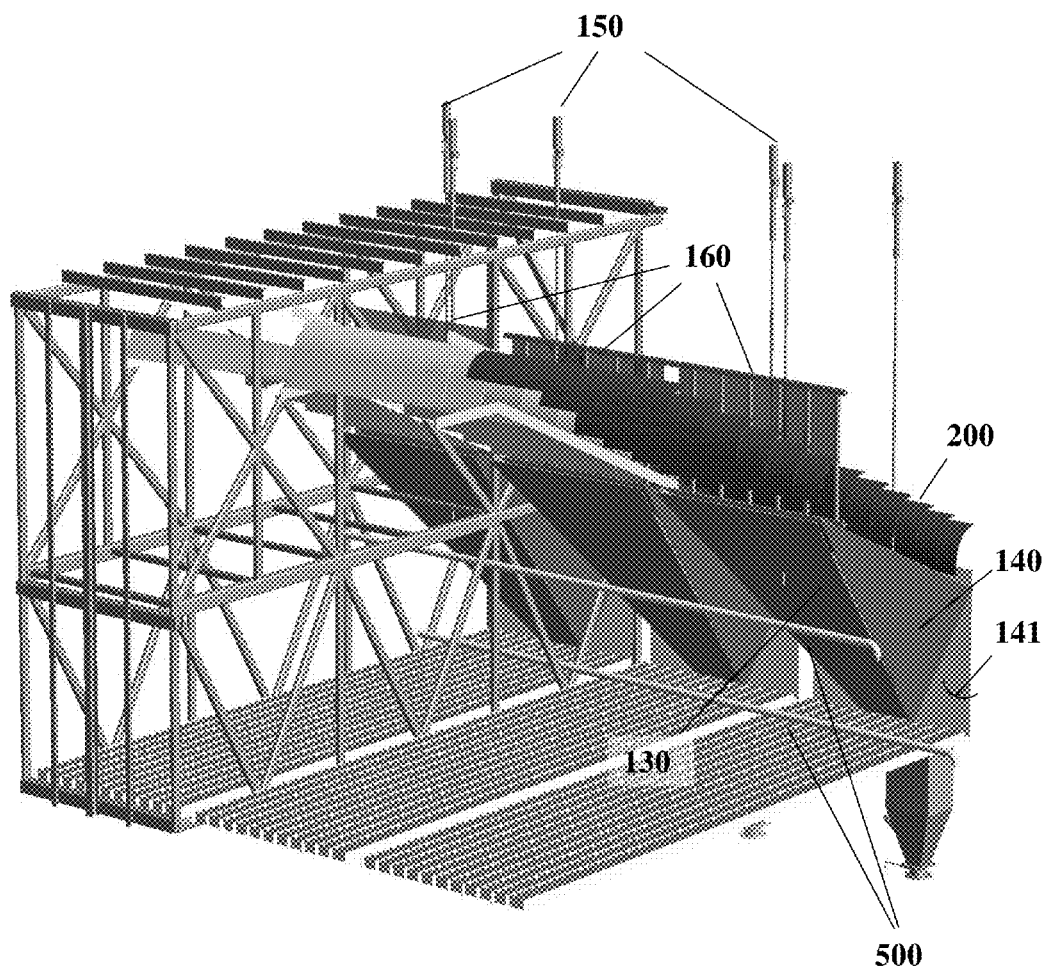
FIG. 3 is a view from opposite side to that depicted FIG. 2.

FIG. 3 illustrates another embodiment of the LPA mitigation system, this time from a view from the opposite side to that depicted FIG. 2. It is apparent from this drawing that the side(s) of the triangular screens 140 adjacent to the sidewall are angled relative to vertical (denoted by 141) in order to make the mouth of the trough larger than the LPA discharge opening that is fed by the screen trough. In this embodiment, all three screen sections slope downward to facilitate LPA rolling toward the LPA discharge opening, with approximately larger than 35 degrees from the horizontal. It is apparent to those skilled in the art that the opposing triangular screen sections included in each screen trough will be angled in opposite directions relative to the vertical in order to construct a substantially symmetrical screen trough funneling the LPA toward the center of the trough. FIG. 3 illustrates an embodiment wherein the center screen section 130 is a rhomboid arranged to feed the LPA to the LPA discharge opening with the shorter end at the bottom and angled downward relative to the horizontal. An alternative feature illustrated in FIG. 3 is the use of air sootblowers 500. The air sootblowers include pipes that deliver pressurized air to the screens in order to discharge LPA that has become lodged in the screen openings. In the embodiment shown in FIG. 3 the air sootblowers are positioned along the back side of the center screen section(s) 130 with some distance, to deliver pressurized air to cover substantially all of the surface area of the LPA mitigation system screens with least potential of screen erosion.

Additionally, the embodiment of FIG. 3 shows 3 separate screen troughs included in the LPA mitigation system. The three screen troughs should substantially meet along their topmost edges so that LPA and the flue gas stream will meet a substantially uninterrupted ridge along the intersection of any two troughs, or the troughs may meet at a support structure so long as there is insufficient space for LPA to pass through. This ridge, the top profile angle, may be angled relative to the horizontal as is apparent from FIG. 3. For ease of illustration, the sidewalls of the SCR reactor perpendicular to the inlet sidewall were omitted from the drawings. However, it is important to note that the screen troughs of the LPA mitigation system should cooperate to cover substantially the entire width of the SCR reactor in this direction (the direction into and out of the page of FIG. 1), but need not cover an entire cross-section of the SCR reactor.

After the LPA that is segregated by the screens travels to LPA collecting means 410, the LPA may be removed by a conveying system. Both FIGS. 2 and 3 show 3 troughs, but it is important to note that the number of troughs will be determined by the size of SCR reactor and interior structural steel arrangement.

Figure 4:
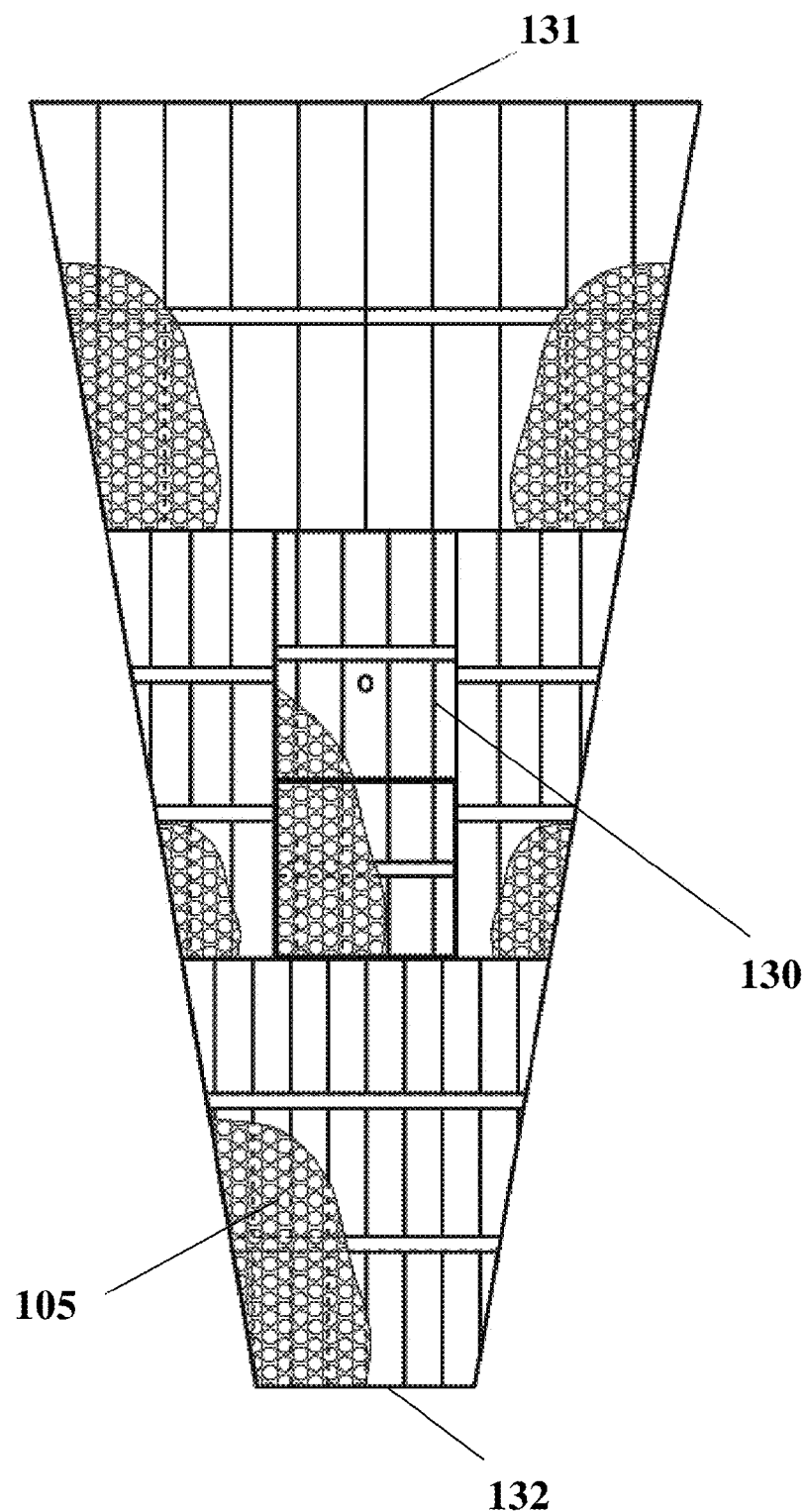
FIG. 4 is a top view of a central screen as in the embodiment of FIGS. 2 and 3.

FIG. 4 shows an embodiment of a central screen section 130. This screen embodiment is employed in the troughs shown in FIGS. 2 and 3. It is clear from the drawings that the top side 131 and bottom side 132 are substantially parallel. However, when arranged in a trough, the top side should be positioned above the bottom side, at an angle relative to the horizontal, to allow the LPA to roll toward the bottom side and funnel into the discharge opening. Moreover, the length of the top side provides a greater span for collecting LPA once again enhancing the funneling effect. Additionally, in FIG. 4 an embodiment of the screen is shown. In this embodiment the screen is a perforated plate of metal 105. The plate may be comprised of for example stainless steel, carbon stainless or otherwise and may be of any thickness ranging from 5 to 30 gauge. Here, the screen has circular perforations arranged in offset parallel rows. The perforations should be small enough to prevent the LPA from passing, but need to be large enough that a significant pressure drop is not caused. The perforations may be between about $1/16$ in and $3/4$ in with anywhere between $1/64$ and $1/2$ in between rows and between $1/64$ and $1/2$ in between adjacent perforations in the same row.

Having shown and described an embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A large particle ash (LPA) mitigation arrangement for use in a coal fired plant, the coal fired plant having a selective catalytic reduction (SCR) reactor, a flue gas stream and a SCR apparatus, the SCR reactor having an inlet sidewall on the upstream side, the mitigation arrangement comprising:
    a plurality of screens positioned near the top of the SCR reactor above the SCR apparatus;
    the screens arranged across a portion of the flue gas flow on the inlet side of the SCR reactor in the shape of a trough;
    a screen cleaning apparatus, the screen cleaning apparatus comprising at least one of a rapper and/or a sootblower;
    a LPA discharge opening;
    the trough positioned to direct segregated LPA into the LPA discharge opening; and
    an LPA collecting means in communication with the discharge opening for collection of LPA and subsequent removal.

2. The arrangement of claim 1, wherein the plurality of screens comprises perforated plate screens.

3. The arrangement of claim 1, wherein the plurality of screens includes three screens, a central rhomboid screen and two substantially opposing triangular side screens, and wherein the screens are arranged in an inverted pyramid shape.

4. The arrangement of claim 3, further comprising a vertical screen section near the top side of a central screen section.

5. The arrangement of claim 1, wherein the screens are positioned in a region of reduced flue gas velocity.

6. The arrangement of claim 1, wherein the screens are angled such that LPA rolls downward for collection in a hopper.

7. The arrangement of claim 1, wherein the screen creates a generally funnel-shaped path for the LPA.

8. A large particle ash (LPA) mitigation system for use in a coal-fired power plant, the coal-fired power plant having a flue gas stream that passes through a selective catalytic reduction (SCR) reactor having an inlet sidewall on the upstream side and at least one SCR catalyst downstream therefrom, the mitigation system comprising:
- at least one LPA mitigation trough formed from a plurality of screens, the at least one LPA mitigation trough positioned along the inlet sidewall of the SCR reactor at a location upstream of the at least one SCR catalyst, such that the at least one LPA mitigation trough extends across at least a portion of the flue gas stream passing through the SCR reactor;
- a LPA discharge opening associated with the at least one LPA mitigation trough such that segregated LPA is directed by the at least one LPA mitigation trough into the LPA discharge opening;
- a LPA collecting mechanism in communication with the LPA discharge opening; and
- a screen cleaning apparatus for removing LPA deposits from at least one of the screens that form the at least one LPA mitigation trough.

9. The system of claim 8, wherein the plurality of screens are comprised of perforated metal plates.

10. The system of claim 8, wherein each of the plurality of screens includes three screens, one of which is a central rhomboid screen and the other two of which are substantially opposing triangular side screens, such that when assembled the screens form a LPA mitigation trough of substantially inverted pyramid shape.

11. The system of claim 10, further comprising a vertical screen coupled to a top side of the central screen.

12. The system of claim 8, wherein the flue gas stream flows through the SCR reactor and across the at least one LPA mitigation trough in a substantially vertical direction.

13. The system of claim 12, further comprising a set of turning vanes located upstream of the at least one LPA mitigation trough for redirecting the flue gas stream along a vertical path through the SCR reactor.

14. The system of claim 8, wherein the screen cleaning apparatus is comprised of one or more devices selected from the group consisting of a rapper and a soot blower.

15. A large particle ash (LPA) mitigation system for use in a coal-fired power plant, the coal-fired power plant having a flue gas stream that passes through a selective catalytic reduction (SCR) reactor having an inlet sidewall on the upstream side and at least one SCR catalyst downstream therefrom, the mitigation system comprising:
- a plurality of LPA mitigation troughs each formed from a plurality of screens, the LPA mitigation troughs positioned along the inlet sidewall of the SCR reactor and within a rectifier section thereof that is located upstream of the at least one SCR catalyst, such that the LPA mitigation troughs extend across at least a portion of the flue gas stream passing through the SCR reactor;
- a LPA discharge opening corresponding to each LPA mitigation trough such that segregated LPA is directed by the LPA mitigation troughs into the LPA discharge openings;
- a LPA collecting mechanism in communication with the LPA discharge openings; and
- a screen cleaning apparatus for removing LPA deposits from at least one of the screens of each of the LPA mitigation troughs.

16. The system of claim 15, wherein each LPA mitigation trough is comprised of three perforated metal plate screens, one of which is a central rhomboid screen and the other two of which are substantially opposing triangular side screens, such that when assembled the screens form a LPA mitigation trough of substantially inverted pyramid shape.

17. The system of claim 16, further comprising a vertical screen coupled to a top side of one or more of the central screens.

18. The system of claim 15, wherein the flue gas stream flows through the SCR reactor and across the LPA mitigation troughs in a substantially vertical direction.

19. The system of claim 18, further comprising a set of turning vanes located upstream of the LPA mitigation troughs for redirecting the flue gas stream along a vertical path through the SCR reactor.

20. The system of claim 15, wherein the screen cleaning apparatus is comprised of one or more devices selected from the group consisting of a rapper and a soot blower.

* * * * *